United States Patent
Farell et al.

(10) Patent No.: US 11,867,579 B2
(45) Date of Patent: Jan. 9, 2024

(54) METHOD FOR DETECTING AN ERROR STATE WHEN ASPIRATING A LIQUID

(71) Applicant: EUROIMMUN Medizinische Labordiagnostika AG, Lübeck (DE)

(72) Inventors: Danny Farell, Groß Siemz (DE); Anna Katharina Laarmann, Ratzeburg (DE)

(73) Assignee: EUROIMMUN Medizinische Labordiagnostika AG, Lübeck (DE)

( * ) Notice: Subject to any disclaimer, the term of this patent is extended or adjusted under 35 U.S.C. 154(b) by 0 days.

(21) Appl. No.: 17/843,995

(22) Filed: Jun. 18, 2022

(65) Prior Publication Data
US 2022/0404226 A1    Dec. 22, 2022

(30) Foreign Application Priority Data
Jun. 18, 2021   (EP) .................................... 21180206

(51) Int. Cl.
*G01L 19/00* (2006.01)
*G01L 27/00* (2006.01)

(52) U.S. Cl.
CPC ........ *G01L 27/007* (2013.01); *G01L 19/0007* (2013.01)

(58) Field of Classification Search
None
See application file for complete search history.

(56) References Cited

U.S. PATENT DOCUMENTS

| | | | | |
|---|---|---|---|---|
| 4,893,515 A | * | 1/1990 | Uchida | G01N 35/1016 73/864.34 |
| 2009/0075386 A1 | * | 3/2009 | Dunfee | G01N 35/1009 436/54 |
| 2014/0137980 A1 | * | 5/2014 | Millet | G01F 11/029 141/95 |

* cited by examiner

*Primary Examiner* — Brandi N Hopkins
*Assistant Examiner* — Nigel H Plumb
(74) *Attorney, Agent, or Firm* — Bochner PLLC; Andrew D. Bochner (57) ABSTRACT

A method for detecting an error state when aspirating a liquid to identify whether a pre-determined volume of liquid was aspirated. The method including: immersing a tip of an aspiration needle in the liquid, aspirating a predetermined partial volume of the liquid in the aspiration needle, continuously acquiring a sensor signal curve, which indicates a pressure in the aspiration needle, during an overall time period, detecting the error state in the case that the sensor signal falls below a first threshold value during the predetermined time period, characterized by providing a reference signal curve, determining a deviation measure, which indicates a deviation of the sensor signal curve from the reference signal curve during the further time period, providing a predetermined second threshold value, detecting the error state as a function of the deviation measure and the second threshold value.

8 Claims, 10 Drawing Sheets

METHOD FOR DETECTING AN ERROR STATE WHEN ASPIRATING A LIQUID

CROSS-REFERENCE TO RELATED APPLICATIONS

The present application claims priority pursuant to 35 U.S.C. § 119(a) to EP patent application 21180206.1, filed Jun. 18, 2021, which is incorporated by reference herein in its entirety.

STATEMENT RE. FEDERALLY SPONSORED RESEARCH/DEVELOPMENT

Not Applicable.

NAMES OF THE PARTIES TO A JOINT RESEARCH AGREEMENT

Not Applicable.

INCORPORATION-BY-REFERENCE

Not Applicable.

STATEMENT RE. PRIOR DISCLOSURES

Not Applicable.

FIELD OF THE INVENTION

Machines are known for assaying human or animal samples in liquid form, using which such test samples are supplied in an automated manner to a biochemical assay using aspiration needles. Such sample liquids are thus in particular liquids of human or animal samples in liquid form, for example, blood, urine, or cerebrospinal fluid. For such a biochemical assay, it is often necessary to aspirate specific, predefined volumes of such samples from a liquid device or a liquid container into an aspiration needle to then be able to transfer the predefined or predetermined volume of the sample liquid via the aspiration needle, for example, into another container.

Such liquid samples of human or animal origin cannot be provided to an unlimited extent, but rather are often only present in a certain amount or a certain volume in laboratory operation. It is also important for this reason to deal carefully with the provided sample amount in the course of the biochemical assay.

DESCRIPTION OF THE RELATED ART

A frequently occurring problem is that such sample liquids sometimes have particles or solid components, which can result in clogging of the aspiration needle. The aspiration of the desired sample volume is typically induced via producing a negative pressure in the aspiration needle for a predetermined time period, so that by selecting or specifying the predetermined time period, it can be presumed that a specific, desired volume of the sample liquid is aspirated into the needle. If it is the case during this time period of the aspiration or during the time period of the application of the negative pressure to the aspiration needle that the needle is partially or entirely clogged due to a solid sample component, aspiration of a desired or predefined sample volume can no longer be guaranteed.

The object of the present invention is therefore to detect clogging states or an error state of the aspiration needle, in particular of the inner volume of the aspiration needle. In this way, it can be established or concluded whether a desired or predefined sample volume was actually aspirated into the aspiration needle.

Figure 1:
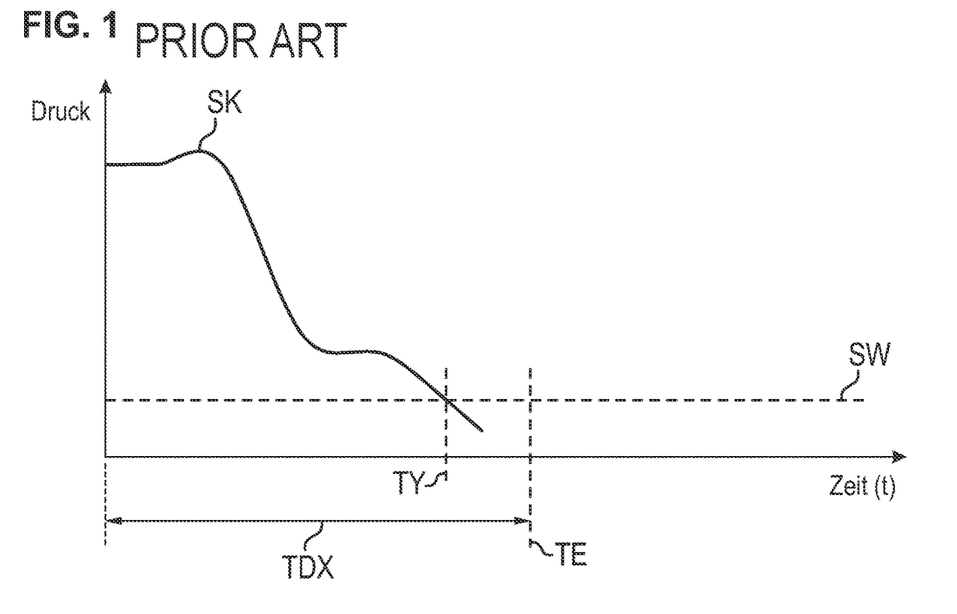
FIG. 1 shows a first exemplary sensor signal curve.

A method is known from the prior art, which is illustrated on the basis of FIG. 1.

The time is plotted on the x axis and the pressure or a pressure signal of a sensor which indicates the pressure in the aspiration needle on the y axis. For a predetermined time period TDX, up to a point in time TE, a negative pressure is generated via a pump device in the line system which comprises the aspiration needle. The pressure inside the aspiration needle or the line system is recorded via a pressure sensor and the corresponding signal is observed or acquired as sensor signal curve SK. If, during the predetermined time period TDX, the value of the sensor signal curve SK or the sensor signal falls below a predetermined threshold value SW, it is thus concluded that clogging of the aspiration needle with continued generation of a negative pressure in the aspiration needle induces an excessively low pressure, so that it is then concluded at a point in time TY on the basis of falling below the threshold value SW that clogging of the aspiration needle exists.

The invention proposes an improved solution as an alternative thereto.

BRIEF SUMMARY OF THE INVENTION

A method is proposed for detecting an error state when aspirating a liquid, including the following steps: immersing a tip of an aspiration needle in the liquid, generating a negative pressure in the aspiration needle for a predetermined time period to aspirate a predetermined partial volume of the liquid in the aspiration needle, continuously acquiring a sensor signal curve via continuous measurement of a sensor signal which indicates a pressure in the aspiration needle during an overall time period, which comprises the predetermined time period and furthermore a further time period following the predetermined time period, detecting the error state in the case that the sensor signal falls below a first threshold value during the predetermined time period. The method is characterized by the following steps: providing a reference signal curve, determining a deviation measure which indicates a deviation of the sensor signal curve from the reference signal curve during the further time period, providing a predetermined second threshold value, and finally detecting the error state as a function of the deviation measure and the second threshold value.

The detection of the error state preferably takes place as a function of the deviation measure and the second threshold value after expiration of the predetermined time period.

An output of an error signal preferably takes place in the case that the error state was detected.

An alignment in time of the sensor signal curve and the reference signal curve in relation to one another preferably takes place.

The method preferably furthermore includes the following steps: specifying a target aspiration volume, providing a base reference curve, and generating the reference signal curve via modification of the base reference curve.

The method preferably furthermore includes the following steps: specifying a target aspiration volume to be reached, providing multiple base reference curves, selecting one of the base reference curves as a function of the target aspiration volume, and generating the reference signal curve via modification of the selected base reference curve.

Filtering of the sensor signal via a mean value filter in particular preferably takes place.

In particular, the pressure generating unit does not generate negative pressure during the further time period. In particular, generating a negative pressure by the pressure generating unit ends at the end of the predetermined time period.

Furthermore, a device is proposed for detecting an error state when aspirating a liquid, including: an aspiration needle having a tip, an activatable movement device for moving the aspiration needle, in particular to immerse the tip of the needle in a liquid, a pressure generating unit for generating a negative pressure in the aspiration needle, a pressure sensor unit for measuring a sensor signal which indicates a pressure in the aspiration needle, and an activation and evaluation unit having a first interface to the pressure generating unit, furthermore a second interface to the pressure sensor unit, and a third interface to the movement device. The activation and evaluation unit is furthermore designed to activate the movement device in such a way that the tip of the aspiration needle is immersed in the liquid,
to continuously acquire a sensor signal curve via continuous measurement of the sensor signal during an entire time period, which comprises the predetermined time period and furthermore a further time period following the predetermined time period,
and to detect the error state in the case that the sensor signal curve falls below a first threshold value during the predefined time period.

The activation and evaluation unit is characterized in that it is furthermore designed to predefine a predetermined reference signal curve,
to determine a deviation measure, which indicates a deviation of the sensor signal curve from the reference signal curve during the further time period,
to predefine a predetermined second threshold value,
and to detect the error state as a function of the deviation measure and the second threshold value.

BRIEF DESCRIPTION OF THE DRAWINGS

The invention is explained in more detail hereinafter on the basis of special embodiments without restriction of the general concept of the invention on the basis of the figures. In the figures.

DETAILED DESCRIPTION

Various exemplary embodiments will be described in more detail with reference to the appended drawings, in which several exemplary embodiments are shown.

In the following description of the appended figures, which solely show several exemplary embodiments, identical reference signs can identify identical or comparable components. Furthermore, summarizing reference signs can be used for components and objects which occur multiple times in one exemplary embodiment or in one drawing, but are described jointly with respect to one or more features. Components or objects which are described by the same or summarizing reference signs can be embodied identically with respect to individual, multiple, or all features, for example their dimensions, but possibly also differently, if not otherwise explicitly or implicitly indicated in the description. Optional components are shown by dashed lines or arrows in the figures.

Although exemplary embodiments can be modified and altered in various ways, exemplary embodiments in the figures are shown as examples and are described in detail herein. However, it is to be clear that it is not intended for exemplary embodiments to be restricted to the respective disclosed forms, but rather that exemplary embodiments are more to cover all functional and/or structural modifications, equivalents, and alternatives which are within the scope of the invention. Identical reference signs identify identical or similar elements in the entire description of the figures.

If not defined otherwise here, all terms used herein (including technical and scientific terms) have the same meaning attributed to them by an average person of skill in the art in the field with which the exemplary embodiments are associated. Furthermore, it is to be clear that expressions, for example, those which are defined in generally used dictionaries, are to be interpreted as if they had the meaning which is consistent with their meaning in the context of the relevant technology, and are not to be interpreted in an idealized or excessively formal meaning, as long as this is not expressly defined herein.

The invention will be explained in more detail on the basis of an exemplary embodiment and on the basis of FIG. 2 and FIG. 10.

Figure 10:
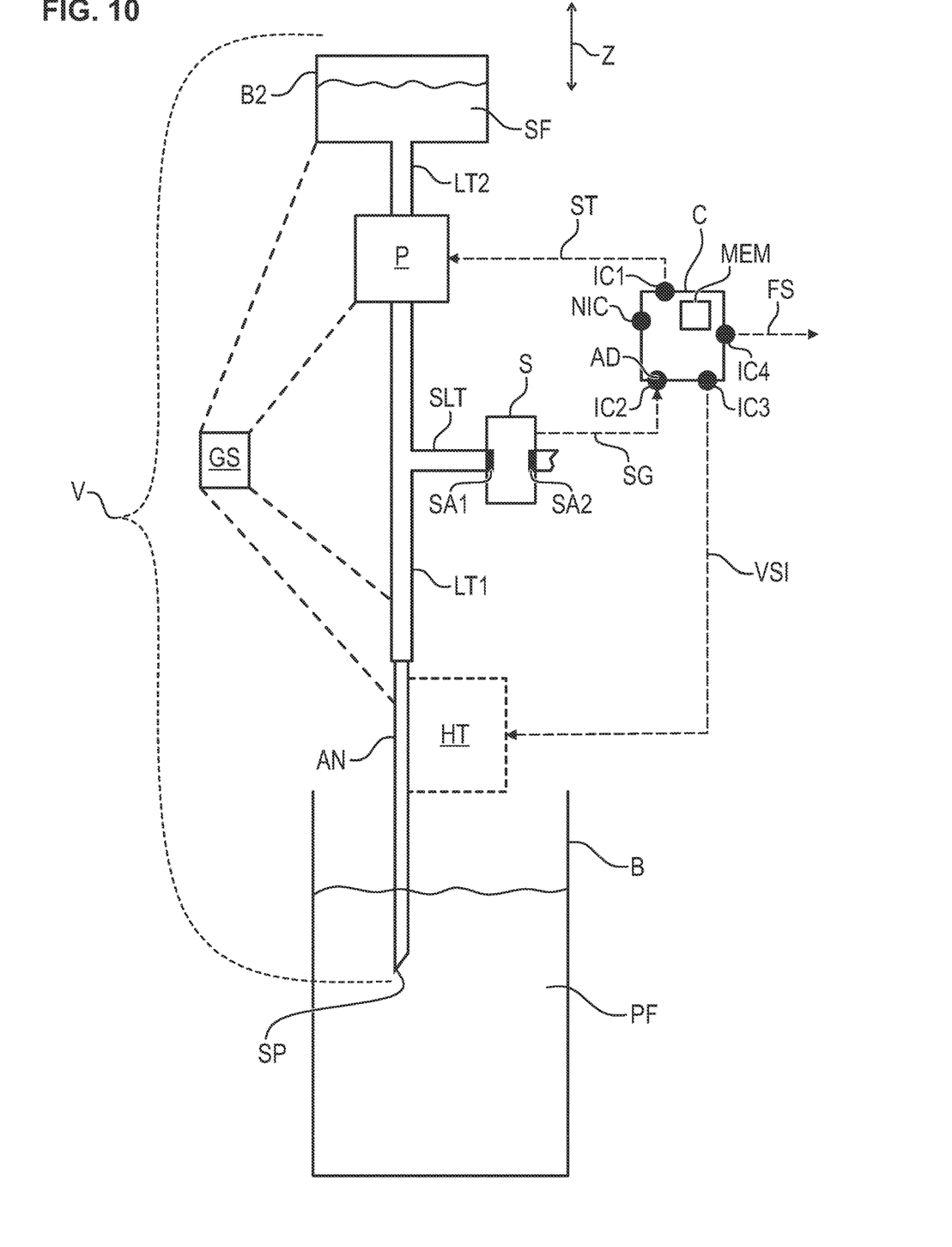
FIG. 10 shows an exemplary embodiment of a device according to the invention.

FIG. 10 illustrates an exemplary embodiment of a device V according to the invention, which comprises an aspiration needle AN having a tip SP, which can be immersed in a liquid or sample liquid PF, which is preferably stored in a container B. The aspiration needle AN is connected via a line system LT1 to a pressure generating unit in the form of a pump P. The line system LT1 is preferably a flexible tube. Furthermore, a pressure sensor unit S is provided. The sensor unit S is connected via a tap line SLT to the line LT1 and has a sensor side or a sensor connection SA1 toward the line system LT1 of the device V. On the connection side SA1 of the sensor S, the pressure is thus measured within the line system LT1, which corresponds to the pressure within the aspiration needle AN. On a further side SA2 of the sensor S, the ambient pressure is measured. A measured value or differential pressure is preferably ascertained therefrom by the sensor S, which corresponds to the negative pressure within the aspiration needle AN in relation to the ambient pressure. The signal SG is transmitted from the sensor S to an evaluation and control unit C as a sensor signal. The evaluation and control unit C accepts the sensor signal SG via an interface IC2, which preferably has an A/D converter.

The pump P is furthermore preferably connected via a further line system LT2 to a container B2, which stores a so-called system liquid SF. This system liquid SF is provided within the device V so that at the beginning of the aspiration of a partial volume of the sample liquid PF this then directly adjoins a boundary layer of the system liquid SF, so that a stall does not occur within the aspiration needle AN.

The evaluation and control unit C can provide a control signal ST via an interface IC1 to the pressure generating unit in the form of the pump P. The evaluation and control unit C furthermore has a memory unit MEM as an experiment.

Via a further interface IC4, the evaluation and activation unit C can preferably provide an error signal FS.

The entire device V is preferably designed so that all of its partial elements are fixed jointly on a framework GS, to then induce an immersion of the tip SP of the aspiration needle AN in the sample liquid PF by moving the framework GS in the z direction. Preferably, only the needle AN is alternatively positioned on a movement device or holder HT, which can be moved in its position, in particular in the z direction, via an interface IC3 by the evaluation and activation unit C via an activation signal VSI. The line LT1 connected to the needle AN is in particular a mechanically flexible line in this case.

Figure 11:
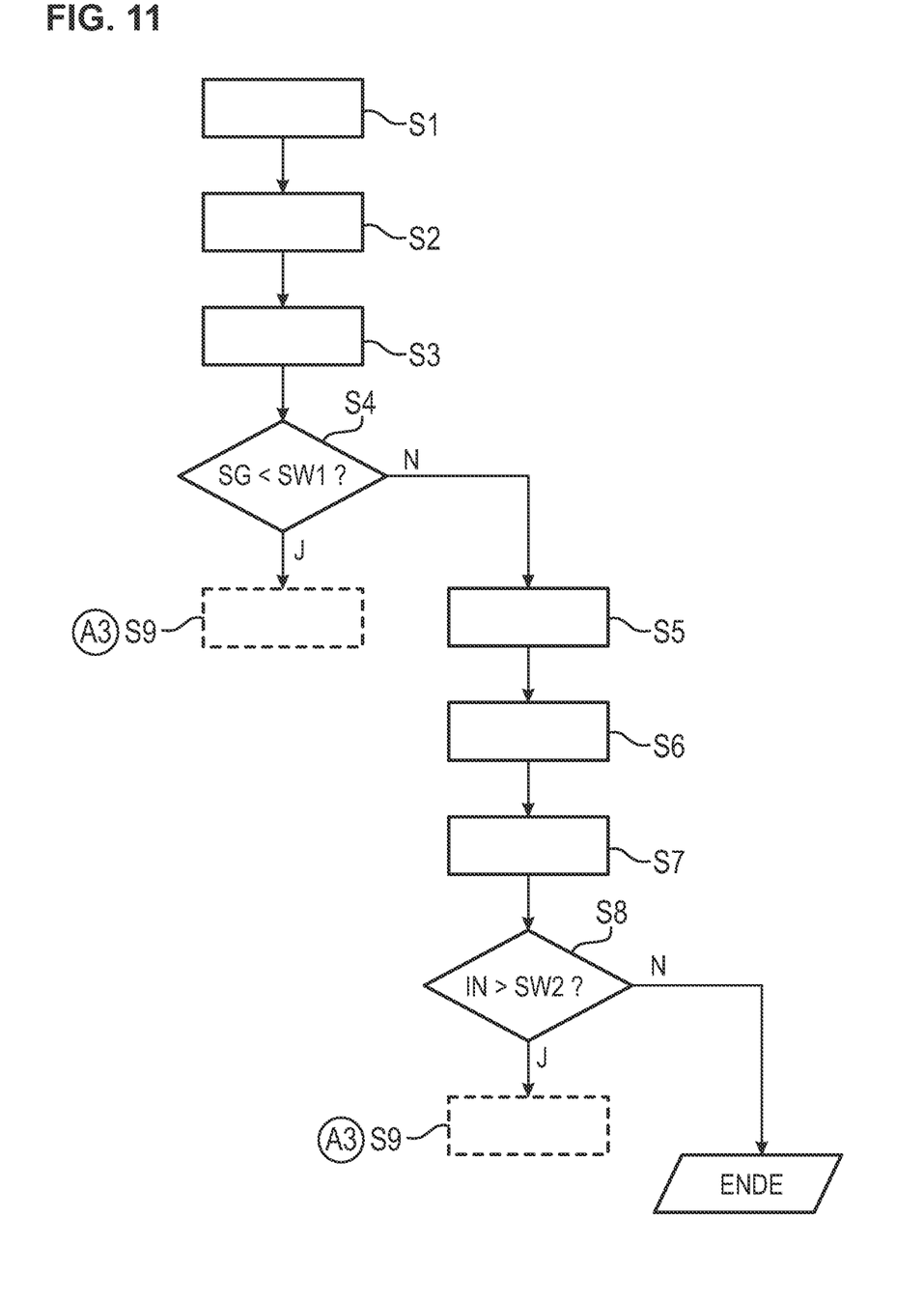
FIG. 11 shows steps of the method according to the invention according to one preferred embodiment.

FIG. 11 shows steps of the method according to the invention. FIG. 2 shows time periods and signal curve profiles corresponding thereto.

In a first step S1, an immersion of the tip SP of the aspiration needle AN in the liquid PF takes place.

Figure 2:
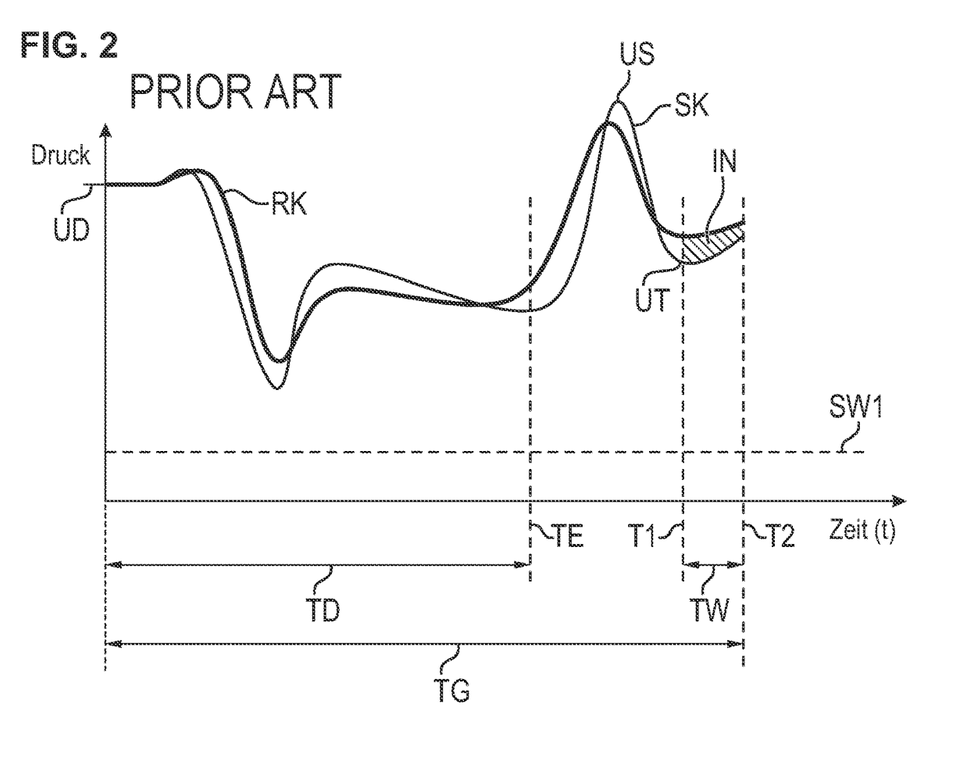
FIG. 2 shows a further sensor signal curve and a reference signal curve.

In a step S2, a generation of a negative pressure in the aspiration needle takes place for a predetermined time period TD, see FIG. 2, in particular up to a point in time TE, to induce an aspiration of a predetermined partial volume of the liquid PF in the aspiration needle AN.

In a step S3, a continuous acquisition of a sensor signal curve SK is carried out via continuous measurement of the sensor signal SG from FIG. 10, which indicates a pressure in the aspiration needle, during an overall time period TG. The overall time period TG comprises the predetermined time period TD and a further time period TW following the predetermined time period TD. The further time period TW extends from the point in time T1 to the point in time T2. The further time period TW does not have to follow the predetermined time period TD directly. This is shown in FIG. 2 in that the point in time T1 does not correspond to the point in time TE.

In a step S4, an error state is detected in the case that the sensor signal or the sensor signal curve SK falls below a first threshold value SW1 during the predefined time period TD. This case is not provided in FIG. 2, since the sensor signal or the sensor signal curve SK does not fall below the threshold value SW1. If the sensor signal curve from FIG. 2 were to have a profile like the sensor signal curve SK from FIG. 1, an error state would then also be detected in the method according to the invention proposed here, as described above on the basis of FIG. 1 according to the prior art.

The method according to the invention is characterized by further steps and is thus advantageous over the prior art.

In a step S5, a reference signal curve RK, which is predetermined in particular, is predefined, for example, via a data set from a memory unit MEM, see FIG. 10.

In a step S6, a determination of a deviation measure IN then takes place, see FIG. 2, which indicates a deviation of the sensor signal curve SK from the reference signal curve RK during the further time period TW.

For example, the deviation measure IN can be ascertained as the integral of the difference between reference signal curve RK and sensor signal curve SK, wherein the integral in particular has as the lower and upper limit the starting point in time T1 and the end point in time T2, respectively, of the further time period TW.

In a step S7, a second, in particular predetermined threshold value SW2 is provided, for example, again via a data set from the memory unit MEM, see FIG. 10.

Furthermore, according to the invention, an error state is then detected as a function of the deviation measure and the second threshold value SW2. In particular, this detection of the error state takes place after expiration of the predetermined time period TD. This detection of the error state particularly preferably takes place after expiration of the further predetermined time period TW.

The error state that the deviation measure IN exceeds the second threshold value SW2 is preferably detected in that case.

The method according to the invention is advantageous for various reasons, which will be explained in more detail hereinafter.

Only monitoring the sensor signal for the time period of the predetermined time period TDX—FIG. 1—or TD—FIG. 2—is known from the prior art, while a negative pressure is generated by a pressure generating unit in the aspiration needle. According to the prior art, an error state due to a partial closure or complete closure of the aspiration needle is then only concluded if the sensor signal or the sensor signal curve SK falls below the lower threshold value SW—FIG. 1—or SW1—FIG. 2. Such falling below a first threshold value SW, SW1 actually often takes place when, in the case of aspiration of greater volumes and an actual complete closure of the aspiration needle AN, an error state exists. However, the inventors have found that there are further error states which result in an aspiration of a liquid volume of an undesired quantity but cannot be detected by simply not reaching the threshold value during the predetermined time period TD, TDX. This is present, for example, in the case that a partial closure of the aspiration needle AN exists or, for example, in the further case that upon complete closure of the needle, only a particularly small amount of a volume is to be aspirated.

FIG. 2 shows a sensor signal curve profile for the case in which a partial closure does not actually result in an extremely strong reduction of the sensor signal curve SK during the time period TD of generating the negative pressure, so that the curve does not fall below the threshold value SW1. However, a partial closure of the aspiration needle has the result that the sensor signal curve SK does not approach the ambient pressure UD fast enough again in particular in the further time period TW. The pressure value displays a typical dynamic oscillation behavior from the point in time TE, from which the pressure generating unit is switched off and the generation of the negative pressure is ended. A typical first overshoot US and also an undershoot UT of the pressure or the sensor signal then follow, after which the sensor signal curve SK then only slowly approaches the ambient pressure UD again. In the case that no clogging or no error state is present, the pressure value of the sensor signal curve would have to again sufficiently quickly approach the sensor value corresponding to the ambient pressure again from the point in time T1 to the point in time T2 and have a profile similar to the reference curve RK. The inventors have recognized that a slow approach—as shown in FIG. 2—of the sensor signal curve SK toward the expected value of the ambient pressure UD permits it to be concluded that only a partial closure of the aspiration needle AN is present. The time period TW is, for example, 10 ms.

The method according to the invention is furthermore also advantageous in the case that only a particularly small volume is to be aspirated into the aspiration needle AN. This is because for such small liquid volumes the pressure generating unit P is typically only activated briefly and then switched off again so quickly that even in the case of a total closure during the activation time period TD up to the end point in time of the activation TE, the sensor signal does not fall below the threshold value SW1. Only by observing a deviation of the sensor signal curve SK from a reference signal curve RK in the later time period TW after the switching off of the pressure generating unit—point in time TE—can a total closure also be detected in the case of aspiration of small volumes. This is because the sensor signal curve SK only slowly approaches the sensor value corresponding to the value of the ambient pressure UD again. The method according to the invention thus also ensures a detection of an error state for this case of the aspiration of small volumes in the case of total closure, which would not be provided by the prior art.

In particular, it can thus be established that the detection of the error state takes place according to the invention in the case that the sensor signal or the sensor signal curve falls below the first threshold value SW1 during the predefined time period TD or also that the deviation measure which is ascertained after the end of the predefined time period TD of the activation of the pressure generating unit deviates sufficiently from a second threshold value SW2 or in particular exceeds it. This is checked in a step S8.

In particular, the detection of the error state takes place here as a function of the deviation measure IN and of the second threshold value E2 after expiration of the predetermined time period TD.

Preferably, in a step S9, an error signal FS is output upon detection of the error state.

This step S9 is also shown in FIG. 11.

The deviation measure can, as described above, be the integral of the difference between the reference signal curve and the sensor signal curve. In this case, with time index t, the deviation measure IN is then preferably $$IN = \int_{T1}^{T2} [RK(t) - SK(t)]$$

Preferably, the deviation measure IN is $$IN = \int_{T1}^{T2} \max[RK(t) - SK(t), 0]$$

Preferably, in the case of a time-discrete measurement using time index k, the deviation measure IN is determined as $$IN = \sum_{k=T1}^{k=T2} \max[RK(k) - SK(k), 0]$$

A detection of the error state takes place as a function of the deviation measure IN and the threshold value, thus as a function f(IN,SW2)

A detection of the error state then takes place in particular in the case that the deviation measure IN exceeds the second threshold value SW2

IN>SW2

Figure 3:
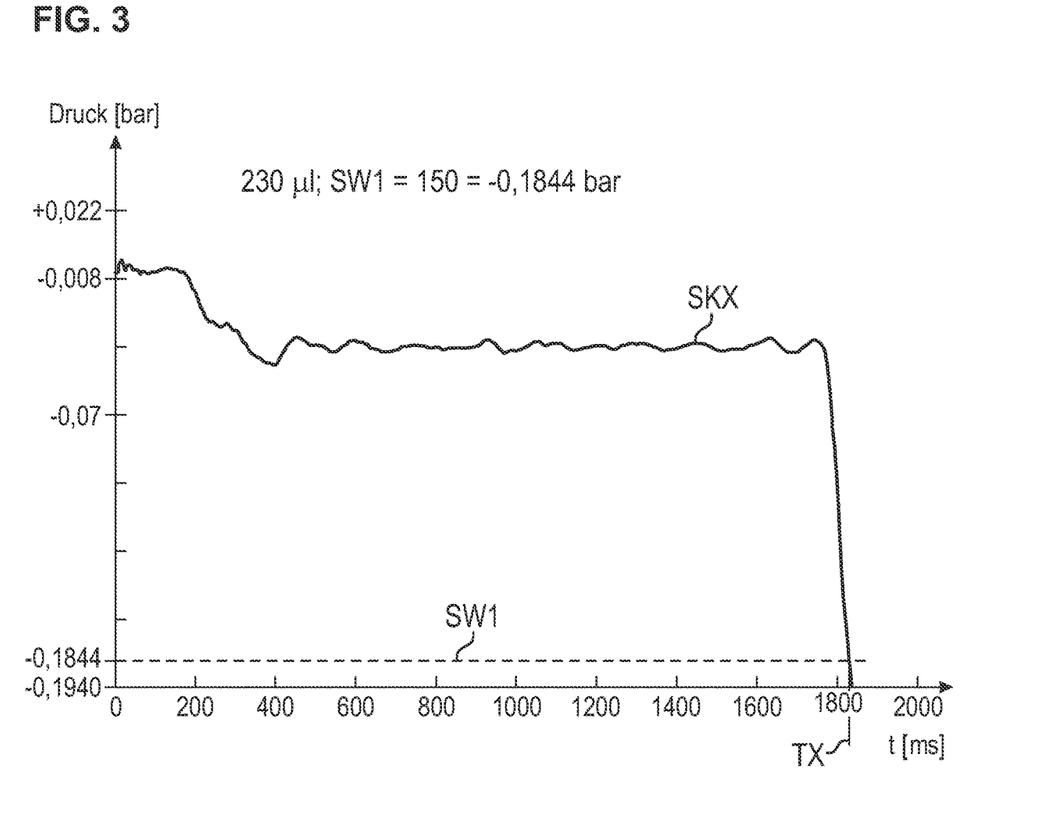
FIG. 3 shows a sensor signal curve during aspiration of a volume of 230 µl.

FIG. 3 shows, from an aspiration process for an aspiration of 230 µl, an exemplary sensor signal curve SKX, wherein the point in time of the end of the predetermined time period was not yet reached. As the threshold value SW1, a negative pressure of −0.1844 bar was used. At the point in time TX, the sensor signal curve SKX clearly falls below the threshold value SW1.

Figure 4:
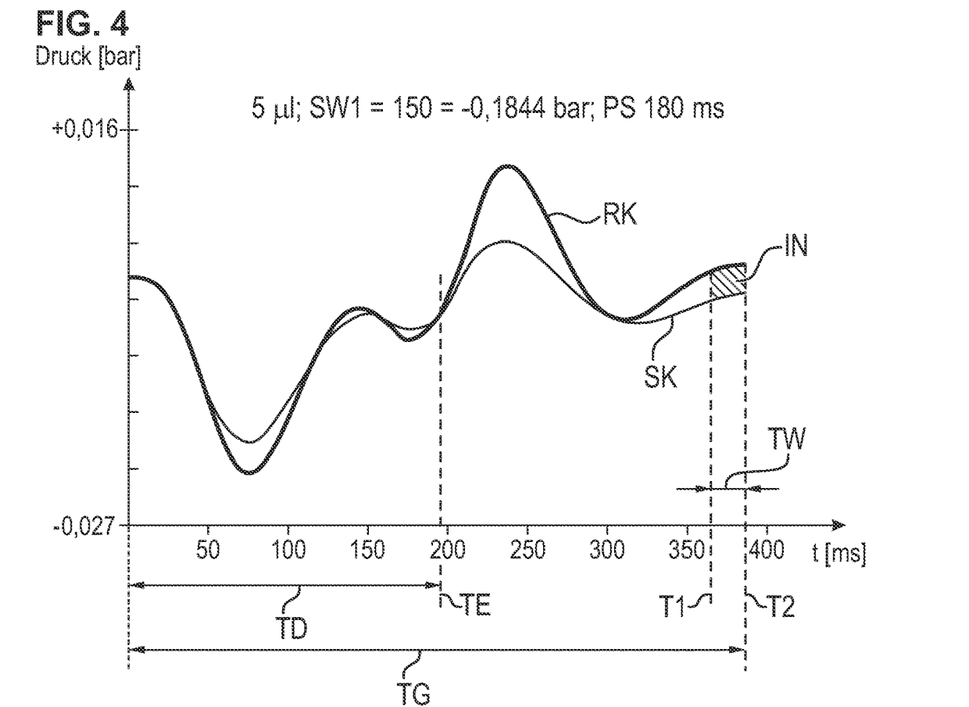
FIGS. 4 and 5 show sensor signal curves during aspiration of a volume of 5 µl.
Figure 5:
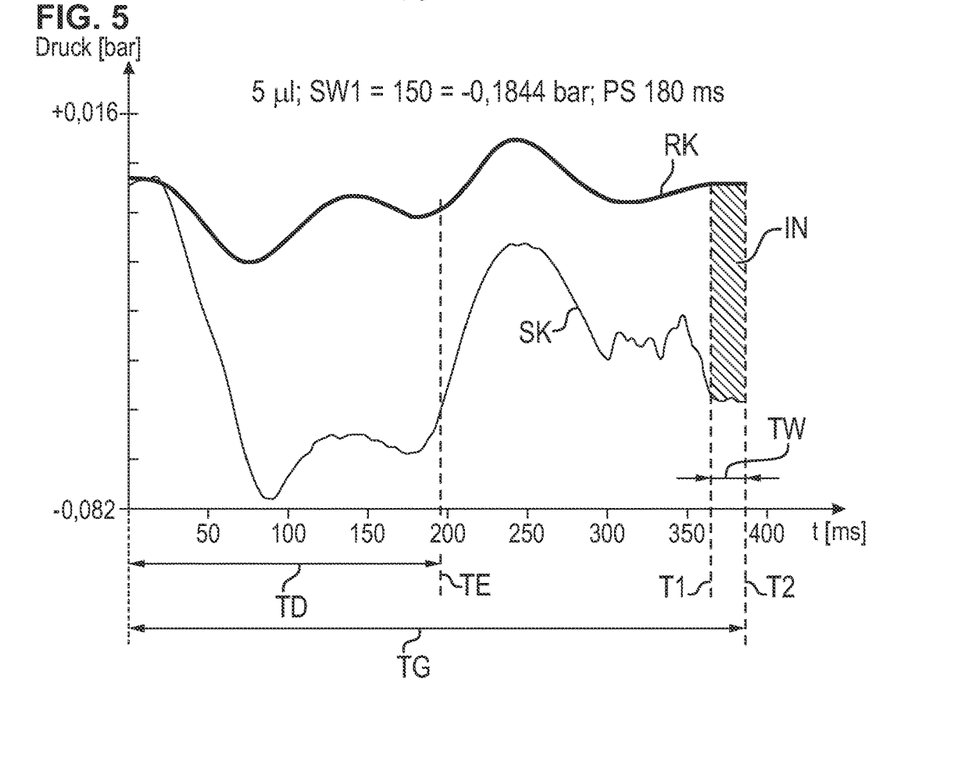
Figure 6:
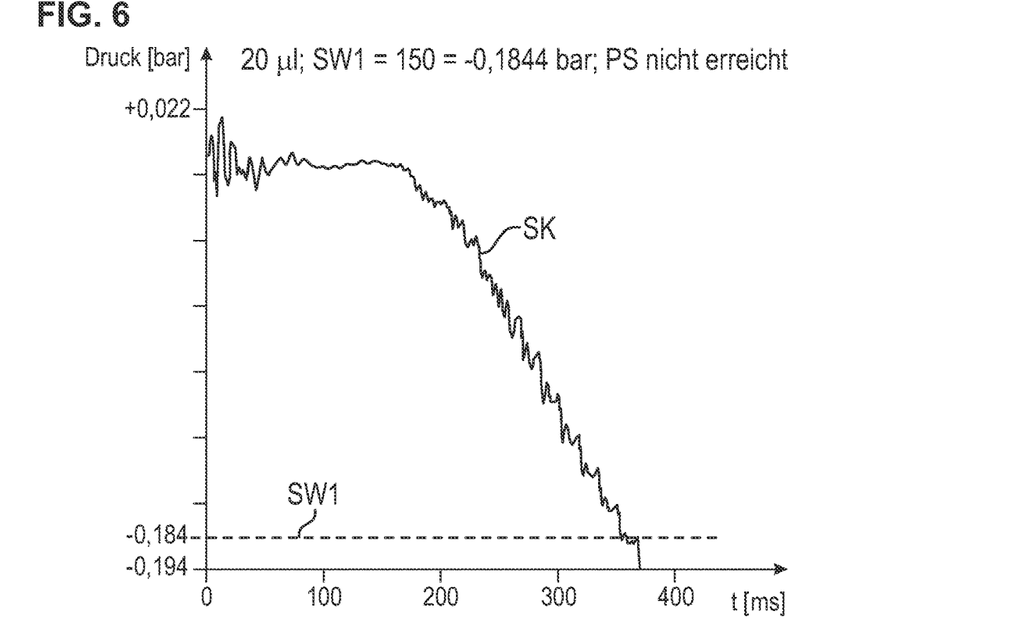
FIGS. 6 and 7 show sensor signal curves in the case of an aspiration of 20 µl.
Figure 7:
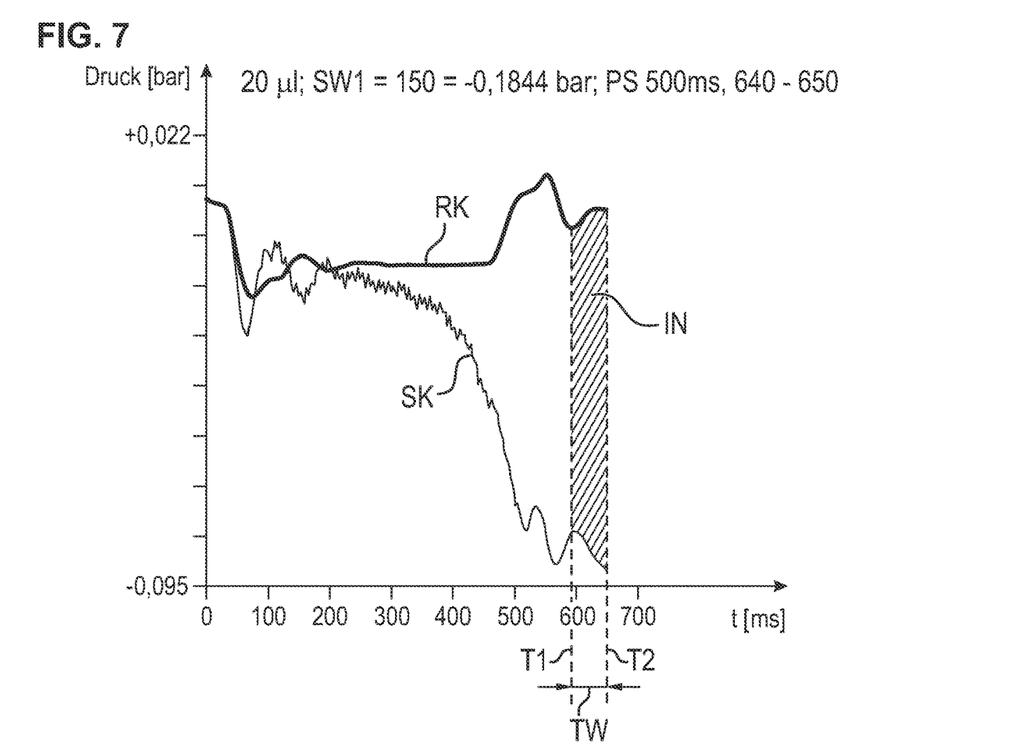

FIG. 4 and FIG. 5 show signal profiles for an aspiration of a particularly small volume of 5 µl, wherein a threshold value of −0.1844 bar was also applied here, which is not visible due to the scaling of they axis, however. In they direction, an amount of the pressure is plotted rising in each case.

FIG. 4 shows the profile of the sensor signal curve SK in the case that no error state is present and no clogging in any form of the aspiration needle AN is provided. At the point in time TE, the predefined time period TD ends and it is to be observed that the sensor signal curve SK extends sufficiently similarly to the reference curve RK during the time period TW. If the integral of the difference of the curves RK and SK were used as the deviation measure IN, this would correspond to the area between the curves RK and SK.

FIG. 5 shows the reference curve from FIG. 4 in a different scaling of the y axis together with another sensor signal SK in the case that an anomaly or a clogging of the aspiration needle is present. The predetermined time period TD is also ended here at the point in time TE and then for the further time period TW the deviation of the sensor signal curve SK from the reference signal curve RK is ascertained, in particular as an integral IN. It is particularly clear here that the sensor signal curve SK, in spite of the presence of at least partial clogging of the aspiration needle, does not fall below the lower threshold value SW1 of −0.1844 bar. By observing the deviation measure IN of a deviation of the sensor signal curve SK from the reference signal curve RK, however, the error state can be reliably detected here on the basis of the method according to the invention.

Figure 12:
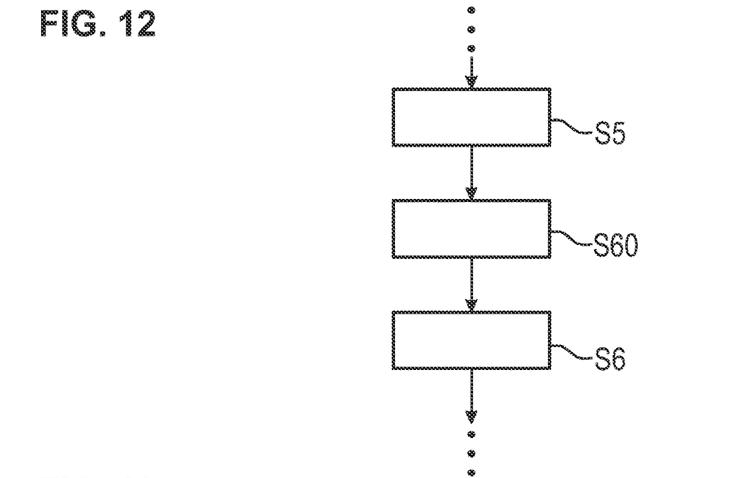
FIGS. 12 to 15 show preferred steps to be carried out of the proposed method.

FIG. 12 shows a further preferred embodiment of the method having further steps preferably to be carried out. Above-described step S5 is preferably followed by a step S60, in which an alignment in time of the sensor signal curve in relation to the reference signal curve takes place in particular after acquisition of the sensor signal curve. This is preferably brought about via correlation of the reference signal curve and the sensor signal curve in relation to one another, and then the time value of the correlation function is selected at which the correlation function assumes its maximum. The sensor signal curve is then offset in time by this time value in relation to the reference signal curve. This alignment takes place in particular before determination of the deviation measure.

Step S60 is then followed by above-described step S6.

The correlation of the reference signal or the reference signal curve to the sensor signal curve is carried out in particular via $$r(\tau) = \int_0^{T2} RK(t) \cdot SK(t-\tau) d\tau$$

The time value $\tau_{max}$ is then the time value by which the sensor signal curve is offset in time with $$\tau_{max} = \mathrm{argmax}\left[r(\tau) = \int_0^{T2} RK(t) \cdot SK(t-\tau) d\tau\right]$$

An accuracy of the determination of the deviation measure IN is enabled or increased in this way.

Figure 13:
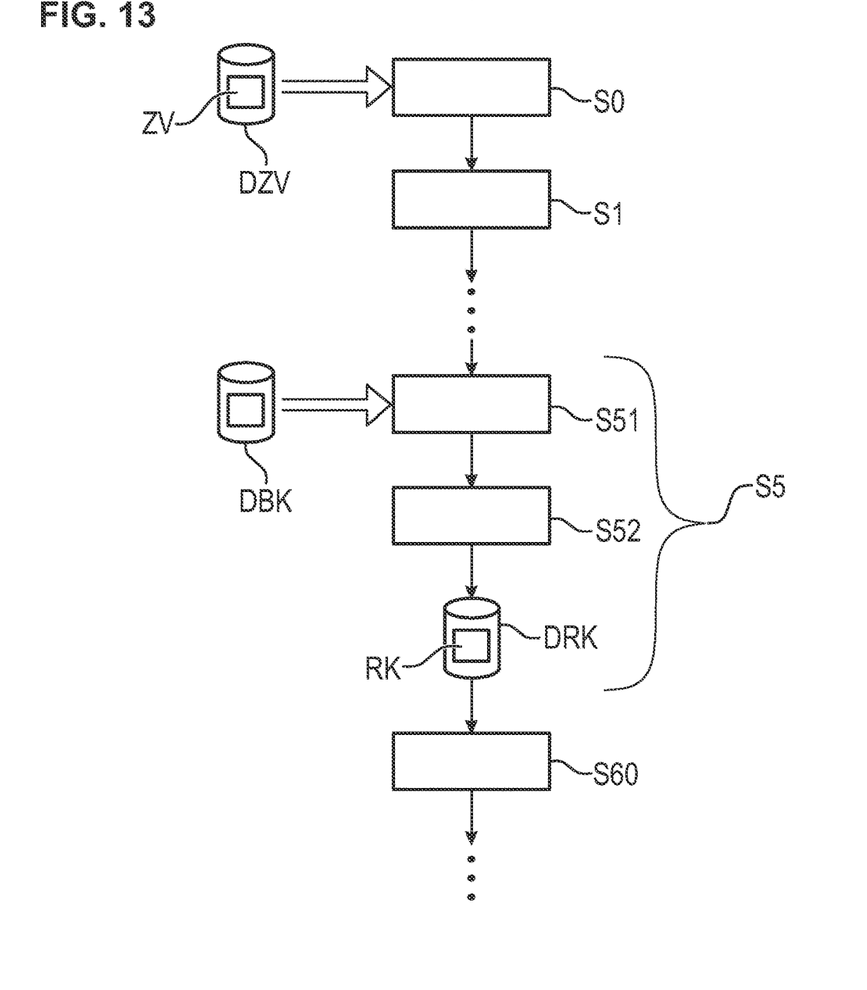

FIG. 13 shows further steps preferably to be carried out. In a step S0, a target aspiration volume ZV to be reached is preferably predefined, which is preferably provided as a data set DZV. Such a target aspiration volume as a data set DZV can be provided, for example, via an interface IC4 shown in FIG. 10 of the activation and evaluation unit C, alternatively preferably via a network interface NIC. The evaluation and activation unit C is in particular connected to a data network via the network interface NIC.

Step S0 is followed according to FIG. 13 by above-described S1.

Step S5, which was described above, is preferably carried out in this embodiment by two steps S51, S52. In a step S51, a base reference curve is provided in the form of a data set DBK.

Figure 8:
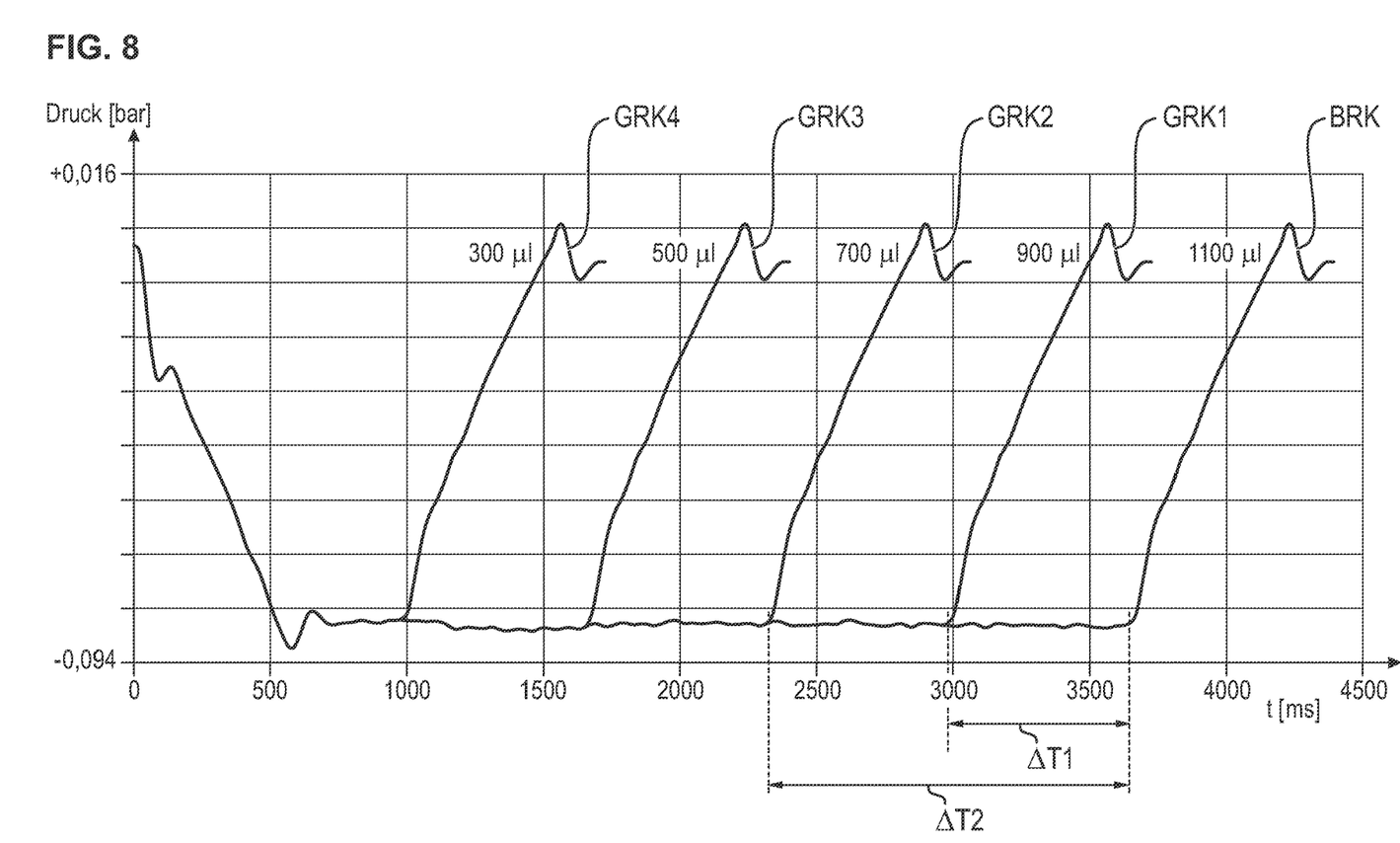
FIG. 8 shows a base reference curve and multiple generated reference curves.

Preferably, a base reference curve BRK is provided as shown in FIG. 8. As a function of a predefined target aspiration volume, the base reference curve BRK is then modified in a step S52. If, for example, a target aspiration volume of 900 µl is predefined, in the example of FIG. 8, the base reference curve BRK is thus modified by cutting out a section ΔT1 from the base reference curve BRK. The base reference curve BRK is valid, for example, for a specific value range of a target aspiration volume of 300 µl bis 1100 µl.

A correspondingly generated reference curve GRK1, . . . , GRK4 can then be obtained in particular, for example, in that the base reference curve BRK is shortened by a predefined time interval ΔT1, see FIG. 8, as a function of the target aspiration volume, so that the generated reference curve GRK1 can be used as the reference curve RK to be used. The generation can take place in particular in that the base reference curve—which has an initial phase, a middle phase in time, and an end phase—is shortened in the middle phase by a time interval ΔT1.

For a target aspiration volume of 700 µl, for example, the base reference curve BRK would be shortened by a time interval ΔT2.

Then, for example, such a generated reference curve or reference signal curve GRK1 can be provided in step S52 as the reference curve RK via a data set DRK. The reference curve RK can then be used in step S6, as described above.

Figure 9:
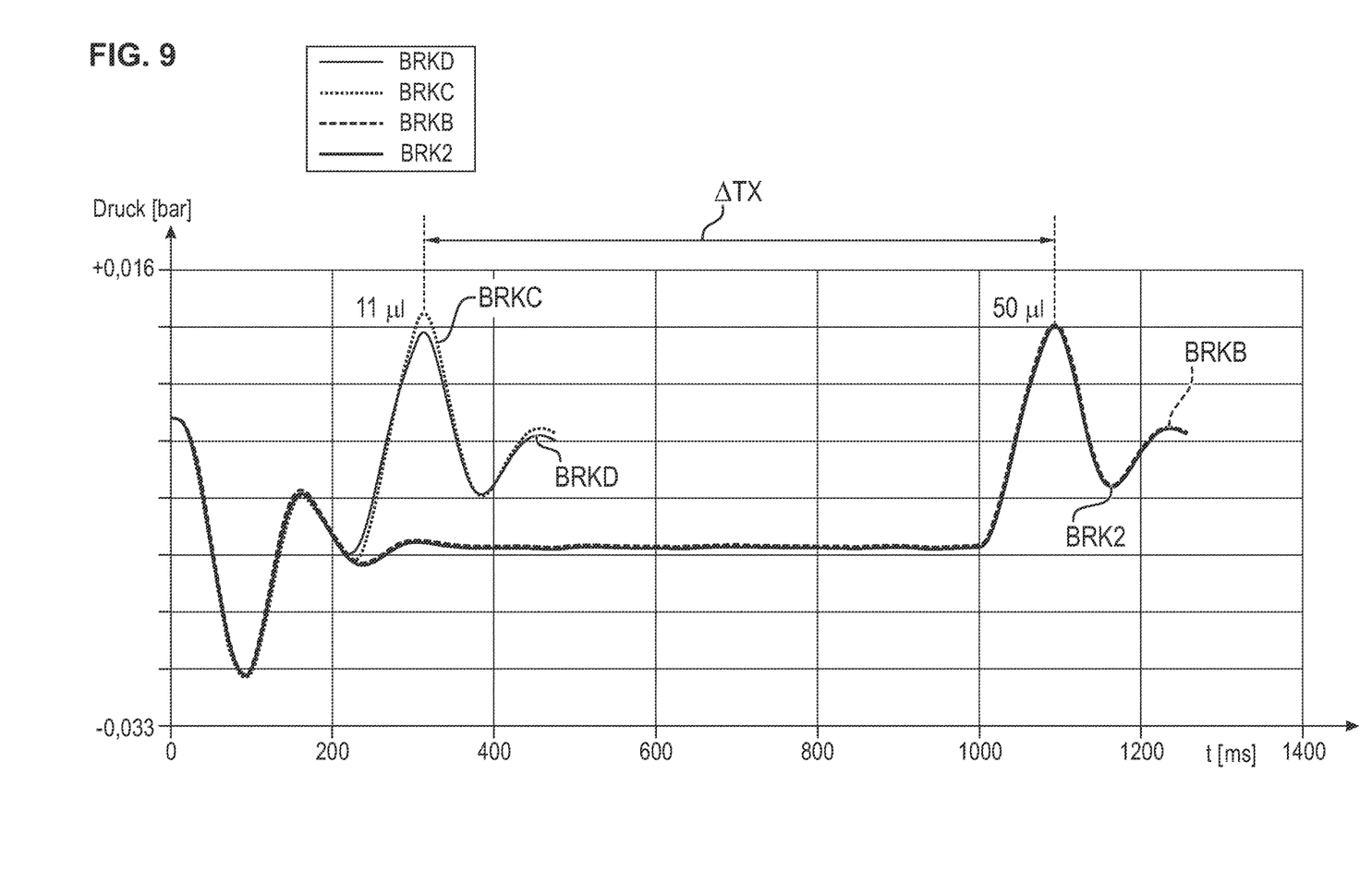
FIG. 9 shows generated and experimentally ascertained reference curves for different volumes.

FIG. 9 shows a further base reference curve BRK2, for example, for a volume range from 11 µl to 50 µl.

Figure 14:
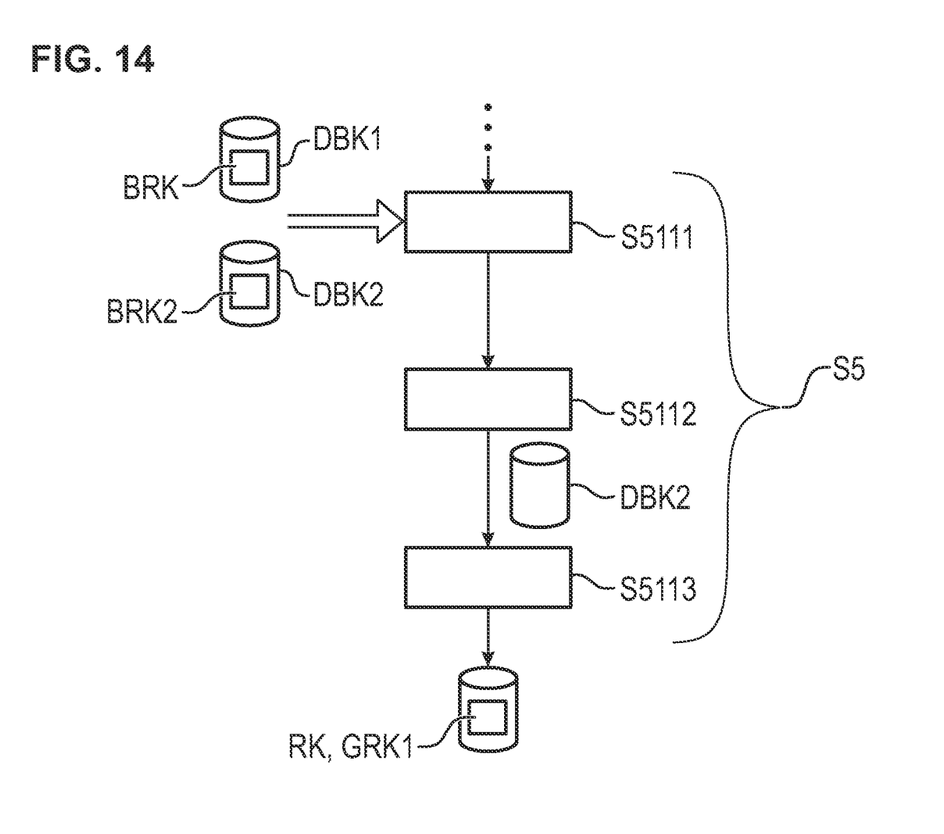

Preferably, as shown in FIG. 14, in a step S5111, multiple respective base reference curves BRK, BRK2 are provided for respective value ranges of target aspiration volumes, in particular as respective data sets DBK1, DBK2. The curve BRK stands, for example, for a value range of the target aspiration volume of 300 µl to 1100 µl, the curve BRK2 stands, for example, for a value range of the target aspiration volume of 10 µl to 50 µl.

In a step S5112, one of these base reference curves is then selected, for example, the base reference curve BRK2 or the data set DBK2, as a function of the target aspiration volume ZV, which is, for example, 11 µl. In a step S5113, the final reference signal curve RK is then generated as the generated curve BRKD, which is indicated by a data set DRK, via modification of the selected base reference curve BRK2 as a function of the target aspiration volume. This modification can preferably take place as explained above with reference to FIG. 8. Preferably, in addition to cutting a time interval out of the base reference curve BRK2, an in particular linear amplitude scaling of the curve BRK2 also takes place to generate the generated curve BRKD.

By providing multiple base reference curves, which represent respective value ranges of target aspiration volumes, the subsequent selection of one of the base reference curves as a function of the target aspiration volume and the modification of the selected base reference curve as a function of the target aspiration volume, it is possible by providing or storing only a few base reference curves to cover a large number of value ranges of target aspiration volumes.

The practicality of the principle of modifying a base reference curve as a function of the target aspiration volume is underlined by the different curves from FIG. 9.

For the target volume value of 50 µl, for example, a reference curve BRKB was experimentally ascertained as the dashed line and a base reference curve BRK2 approximated thereto was constructed.

For a target aspiration volume of 11 µl, a reference curve BRKC was experimentally ascertained. However, if the base reference curve BRK2 for 50 µl is now selected for such a target aspiration volume of 11 µl and then shortened in the direction of time by a time interval ΔTX and also slightly adapted in its amplitude in the y direction, the final reference curve BRKD is thus obtained, which only deviates insignificantly from an experimentally ascertained reference curve BRKC. This underlines that the above-described method of selecting a base reference curve and modifying it actually results in valid reference curves for predefined volumes.

Figure 15:
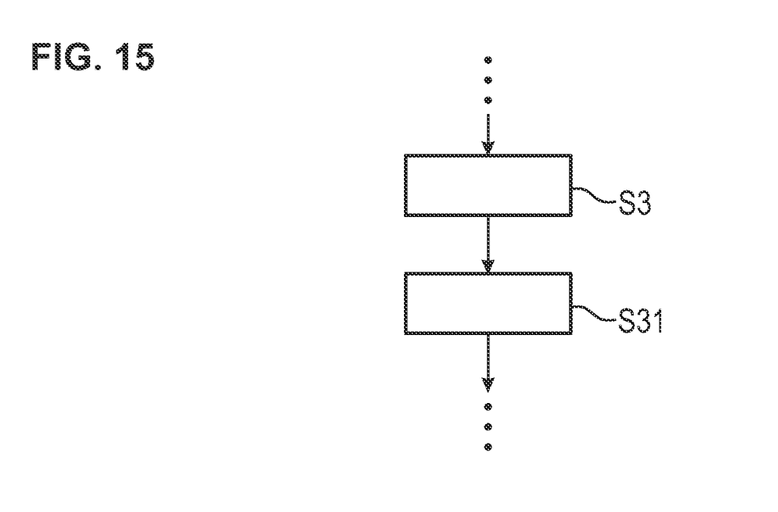

FIG. 15 shows a step S31, which preferably follows step S3. In a step S31, filtering of the sensor signal, in particular via a mean value filter, takes place.

The features disclosed in the above description, the claims, and the drawings can be significant both individually and in any combination for the implementation of exemplary embodiments in their various embodiments and—if not indicated otherwise in the description—can be combined with one another as desired.

Although some aspects were described in conjunction with a device, it is apparent that these aspects also represent a description of the corresponding method, so that a block or a component of a device is also to be understood as a corresponding method step or as a feature of a method step. Similarly thereto, aspects which were described in conjunction with a or as a method step also represent a description of a corresponding block or detail or feature of a corresponding device.

Depending on the specific implementation requirements, exemplary embodiments of the invention can be implemented in hardware or in software. The implementation can be carried out using a digital storage medium, for example, a floppy disk, a DVD, a Blu-ray disk, a CD, a ROM, a PROM, an EPROM, an EEPROM, or a FLASH memory, a hard drive, or another magnetic or optical memory, on which electronically readable control signals are stored which can interact or interact with a programmable hardware component in such a way that the respective method is carried out.

A programmable hardware component, for example, in particular the activation and evaluation unit, can be implemented by a hardware component or a group of hardware components. Hardware components, for example, in particular the activation and evaluation unit, can be formed by a processor, a computer processor (CPU=Central Processing Unit), a graphics processor (GPU=Graphics Processing Unit), a computer, a computer system, an application-specific integrated circuit (ASIC), an integrated circuit (IC), a one-chip system (SOC=System on Chip), a programmable logic element, or a field-programmable gate array having a microprocessor (FPGA).

The digital storage medium can therefore be machine-readable or computer-readable. Some exemplary embodiments thus comprise a data carrier which has electronically readable control signals which are capable of interacting with a programmable computer system or a programmable hardware component in such a way that one of the methods described herein is carried out. One exemplary embodiment is thus a data carrier (or a digital storage medium or a computer-readable medium), on which the program for carrying out one of the methods described herein is recorded.

In general, exemplary embodiments of the present invention can be implemented as a program, firmware, computer program, or computer program product having a program code or as data, wherein the program code or the data is or are active so as to carry out one of the methods when the program runs on a processor or a programmable hardware component. The program code or the data can also be stored, for example, on a machine-readable carrier or data carrier. The program code or the data can be provided, inter alia, as source code, machine code, or byte code and as other intermediate code.

The invention claimed is:

1. A method for detecting an error state when aspirating a liquid, including
immersing a tip of an aspiration needle in the liquid
generating a negative pressure in the aspiration needle for a predefined time period to aspirate a predetermined partial volume of the liquid into the aspiration needle
continuously acquiring a sensor signal curve (SK) via continuous measurement of a sensor signal, which indicates a pressure in the aspiration needle, during an overall time period (TG), which comprises the predetermined time period (TD) and furthermore a further time period following the predetermined time period (TD),
providing a reference signal curve (RK),
characterized by
determining a deviation measure (IN), which indicates a deviation of the sensor signal curve (SK) from the reference signal curve (RK) for the further time period (TW),
providing a predetermined second threshold value (SW2),
detecting the error state in the case that the sensor signal falls below a first threshold value (SW1) during the predetermined time period (TD) or detecting the error state after expiration of the further time period (TW) in the case that the deviation measure (IN) deviates sufficiently from the second threshold value (SW2).

2. The method as claimed in claim 1,
wherein the detection of the error state takes place as a function of the deviation measure (IN) and the second threshold value (SW2) after expiration of the predetermined time period (TD).

3. The method as claimed in claim 1,
furthermore including
outputting an error signal (FS) in the case that the error state was detected.

4. The method as claimed in claim 1,
furthermore including
aligning the sensor signal curve (SK) and the reference signal curve (RK) in time in relation to one another.

5. The method as claimed in claim 1,
furthermore including
specifying a target aspiration volume (ZV),
providing a base reference curve (BRK),
generating the reference signal curve (GRK1, RK) via modification of the base reference curve (BRK), in particular as a function of the target aspiration volume.

6. The method as claimed in claim 1,
furthermore including
specifying a target aspiration volume (ZV),
providing multiple base reference curves (DBK),
selecting one of the base reference curves (DBKX) as a function of the target aspiration volume,
generating the reference signal curve (RK, DRK) via modification of the selected base reference curve (DBKX, BRK2), in particular as a function of the target aspiration volume.

7. The method as claimed in claim 1,
furthermore including
filtering the sensor signal (SG) via a mean value filter in particular.

8. A device for detecting an error state when aspirating a liquid, including
an aspiration needle (AW) having a tip (SP),
an activatable movement device (HT, G) for moving the aspiration needle (AW),
a pressure generating unit (P) for generating a negative pressure in the aspiration needle (AW),
a pressure sensor unit (S) for measuring a sensor signal (SG), which indicates a pressure in the aspiration needle (AN),
an activation and evaluation unit (C) having a first interface (K1) to the pressure generating unit (P), furthermore a second interface (K2) to the pressure sensor unit (S), and a third interface (K3) to the movement device (HT, G),
wherein the activation and evaluation unit (C) is furthermore designed
to activate the movement device (HT, G) in such a way that the tip (SP) of the aspiration needle (AW) is immersed in the liquid (PF),
to continuously acquire a sensor signal curve (SK) via continuous measurement of the sensor signal (SG) during an overall time period (TG), which comprises the predetermined time period (TD) and furthermore a further time period (TW) following the predetermined time period (TD),
to detect the error state in the case in which the sensor signal falls below a first threshold value during the predetermined time period (TD),
to provide a predetermined reference signal curve (RK),
wherein the activation and evaluation unit (C) is characterized in that it is furthermore designed
to determine a deviation measure (IN), which indicates a deviation of the sensor signal curve (SK) from the reference signal curve (RK) for the further time period,
to provide a predetermined second threshold value (SW2), and to detect the error state in the case that the sensor signal fall below a first threshold value during the predetermined time period (TD) or detecting the error state after expiration of the further time period (TW) in the case that the deviation measure (IN) deviates sufficiently from the second threshold value (SW2).

\* \* \* \* \*